(12) United States Patent
Boecker et al.

(10) Patent No.: US 11,927,295 B2
(45) Date of Patent: Mar. 12, 2024

(54) TUBE ARRANGEMENT FOR THE TRANSPORT OF TEMPERING MEDIUM

(71) Applicant: TI Automotive Technology Center GmbH, Rastatt (DE)

(72) Inventors: Albert Boecker, Ettlingen (DE); Matthias Winter, Rastatt (DE); Thorsten Schaefer, Steinfeld (DE); Florian Deibel, Sinzheim (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 148 days.

(21) Appl. No.: 17/338,045

(22) Filed: Jun. 3, 2021

(65) Prior Publication Data
US 2021/0381626 A1 Dec. 9, 2021

(30) Foreign Application Priority Data

Jun. 3, 2020 (EP) .................................. 20178060

(51) Int. Cl.
| | | |
|---|---|---|
| *F16L 9/19* | (2006.01) | |
| *B29C 49/00* | (2006.01) | |
| *B29C 49/20* | (2006.01) | |
| *F16L 9/00* | (2006.01) | |
| *F16L 9/127* | (2006.01) | |
| *H01M 10/625* | (2014.01) | |
| *B29L 23/00* | (2006.01) | |

(52) U.S. Cl.
CPC ............ *F16L 9/19* (2013.01); *B29C 49/0015* (2013.01); *B29C 49/20* (2013.01); *F16L 9/006* (2013.01); *F16L 9/127* (2013.01); *H01M 10/625* (2015.04); *B29C 2049/2034* (2013.01); *B29L 2023/22* (2013.01)

(58) Field of Classification Search
CPC ..... B29C 65/5227; B29C 49/20; B29C 65/70; B29C 49/48; B29C 49/482; B29C 49/04; B29L 2023/00
USPC .......... 138/111, 177, 178, DIG. 11, 115–117
See application file for complete search history.

(56) References Cited

U.S. PATENT DOCUMENTS

| | | | | |
|---|---|---|---|---|
| 3,907,002 A | * | 9/1975 | Gulich ................... | B60K 15/01 138/116 |
| 5,171,044 A | * | 12/1992 | Umezawa ........... | B29C 66/5227 285/423 |
| 6,053,215 A | * | 4/2000 | Sadr .................... | B60H 1/00564 138/DIG. 4 |

(Continued)

FOREIGN PATENT DOCUMENTS

| | | |
|---|---|---|
| JP | H0524101 A | 2/1993 |
| JP | H09076773 | 3/1997 |

(Continued)

OTHER PUBLICATIONS

Japanese Office Action dated Aug. 30, 2022.
Japanese Office Action dated May 9, 2023.

*Primary Examiner* — Patrick F Brinson
(74) *Attorney, Agent, or Firm* — Dickinson Wright PLLC

(57) ABSTRACT

A tube arrangement for the transport of temperature control medium, comprising a base body (2) made of polymeric material and produced by means of blow molding, wherein at least one functional element (3) is arranged in the base body (2), which element is in operative connection with the temperature control medium.

10 Claims, 3 Drawing Sheets

(56) References Cited

U.S. PATENT DOCUMENTS

| | | | | |
|---|---|---|---|---|
| 6,508,275 B1* | 1/2003 | Sadr | ........................ | B60K 15/04 |
| | | | | 138/119 |
| 8,512,839 B2* | 8/2013 | Yung | ........................ | C08L 81/02 |
| | | | | 138/140 |
| 2014/0338781 A1* | 11/2014 | Anderson | .............. | F02M 29/06 |
| | | | | 138/177 |

FOREIGN PATENT DOCUMENTS

| | | | | |
|---|---|---|---|---|
| JP | 2003507615 A | 2/2003 | | |
| JP | 2013049196 A | 3/2013 | | |
| JP | 2015199241 A | 11/2015 | | |
| WO | 0112415 A1 | 2/2001 | | |
| WO | WO-0112415 A1 * | 2/2001 | ......... | B29C 49/4242 |

* cited by examiner

TUBE ARRANGEMENT FOR THE TRANSPORT OF TEMPERING MEDIUM

RELATED APPLICATIONS

The present disclosure claims priority to and is a national phase application of European Application 20178060.8, filed on Jun. 3, 2020, the entire contents of each of which are incorporated herein by reference.

FIELD

The invention relates to a tube arrangement for the transport of tempering medium and a temperature control circuit. The invention also relates to a method for producing a tube arrangement for the transport of tempering medium.

BACKGROUND

Temperature control media or tempering medium are required in electromobility. Batteries in electric vehicles, in particular lithium-ion batteries, have optimum performance only within a limited temperature range. Therefore, depending on the ambient temperature, it may be necessary to heat or cool the batteries. The drive unit of an electric vehicle therefore generally has a temperature control circuit with a tube arrangement, through which temperature control media can be conducted to the cells of the battery in order to control their temperature within a desired temperature range. Due to the limitations of the installation space, the temperature control device should be as compact as possible.

Furthermore, it may be necessary to control the temperature of components of the entire drive unit of electric vehicles, in particular to cool them. In addition to the battery, this includes the power electronics and the electric motor. The charging electronics and the associated plug connections and lines can also be cooled by means of the temperature control device. This is particularly relevant in connection with fast charging processes.

In addition to use in a drive unit, there is another area of application in connection with the rest of the vehicle electronics, in particular sensors and on-board computers. If a vehicle is equipped for autonomous driving, powerful sensors and powerful computers are required, wherein the systems are redundant. Because the installation space is limited, there is also a need for temperature control/cooling by means of a temperature control device in this system.

Temperature control media are also used in air conditioning systems. Air conditioning systems, particularly mobile air conditioning systems, comprise a tube arrangement which enables temperature control medium to be transported between the individual units of the air conditioning system. In mobile air conditioning systems, for example air conditioning systems for the air conditioning of the interiors of motor vehicles, the tube arrangement is a comparatively complex structure and often comprises tubes made of different materials, for example pipes or tubes made of metal, tube sections made of thermoplastic and tube sections made of rubber-like material. Although the conditions of use of the pipe or tube sections can be optimally matched to the respective requirements, the tube arrangement is costly, complex to assemble and difficult to recycle.

BRIEF SUMMARY

The present disclosure is based on the object of providing a tube arrangement for the transport of tempering medium, which can be produced simply and inexpensively.

This object is achieved with the features of the independent claims. The dependent claims that refer back to them refer to advantageous embodiments.

To achieve the object, the tube arrangement for the transport of tempering medium (also referred to herein as temperature control medium or media) comprises a base body made of polymeric material and produced by means of blow molding, wherein at least one functional element is arranged in the base body, which element is in operative connection with the tempering medium.

Tube arrangements of temperature control circuits contain several functional elements required for the functionality of the air conditioning system. These are, for example, throttle valves, check valves, switchable valves, pumps, flow sensors and temperature sensors. In the tube arrangement according to the invention, at least some of the functional elements are arranged in the base body, that is to say within the tube arrangement, so that they are in contact with the tempering medium.

The tube arrangement consists of a base body made of polymeric material and produced by means of blow molding. Blow molding makes it possible to produce a base body with a complex shape. For example, the base body can comprise one or more channels, which can be shaped, for example curved, in the shape required for the installation location. Furthermore, it is particularly easy to form cross-section changes in the channels. For example, sections of the channels can be circular, whereas other sections of the channels are not round, for example oval or rectangular. As a result, the tube arrangement can be designed to be particularly space-saving and adapted to the installation location. Because the functional elements are integrated directly into the base body, assembly is simple and inexpensive.

The base body can comprise at least one channel, the at least one functional element being assigned to the channel. As a result, the functional element is in direct contact with the tempering medium and can either directly influence the volume flow of the temperature control medium or directly record status data of the tempering medium, such as temperature, volume flow or pressure. The functional element can also be designed as a cooler, which is in contact with the temperature control medium and which influences the temperature of the temperature control medium.

The base body can have a plurality of channels, wherein a channel wall can be located between the channels. As a result, the base body can accommodate different tube sections of a temperature control circuit, for example the channel section in front of and behind an evaporator. Both volume flows are separated from one another by the channel wall.

Depending on the number and configuration of the channels, the tube arrangement can also function as a distributor and/or connector.

At least one functional element can be formed from the base body. This is particularly conceivable when the functional element is a passive functional element and does not have any moving parts. For example, the functional element can form a throttle valve. A throttle valve or expansion valve causes a local narrowing of the flow cross-section to reduce the pressure of the tempering medium flowing through and at the same time causes the tempering medium to expand. The throttle valve is designed as an unregulated throttle valve and forms a constriction of the channel. Because the throttle valve is formed directly from the base body, the tube arrangement can be manufactured particularly inexpensively and easily. The functional element can also be designed as a fluid distribution element. It is also conceivable that the functional element is designed as a connecting element or connector. As a result, the tube arrangement can be equipped to be connected to other components of a temperature control circuit.

At least one functional element can be formed separately from the base body. Functional elements are preferably formed separately from the base body and have components made of non-thermoplastic material and/or can be actively controllable. Such functional elements are, for example, throttle valves made of metallic material, switchable valves, check valves with metallic spring bodies, sensors, for example temperature sensors, pressure sensors or flow sensors, pumps, connecting elements or connectors for connecting the tube arrangement to units or the like. The separately designed functional elements are arranged within the base body. The base body in turn consists of a base body made of polymeric material and produced by means of blow molding, which is made of a single material and is made in one piece. The separately formed functional elements are placed in the interior of the blank forming the base body before the base body is formed with the blow molding process. After forming by means of blow molding, the fluidic functional elements are arranged in a stationary manner in the base body. This enables the production of a functional tube arrangement with complex geometry with simple process steps.

In one use according to the invention, the tube arrangement forms part of a temperature control circuit.

According to a first embodiment, the tube arrangement is part of an air conditioning circuit of an air conditioning system. The air conditioning system can in particular be designed as a mobile air conditioning system. The mobile air conditioning system, in turn, can be part of a motor vehicle, the air conditioning system being used for air conditioning the vehicle interior. Because the base body of the tube arrangement may have a complex geometry and can contain several fluidic functional elements, the tube arrangement is nevertheless easy to assemble and has only a few parts. To this extent, the tube arrangement according to the invention simplifies the complexity, in particular, of a mobile air conditioning system in a motor vehicle. This is particularly advantageous with regard to electrically driven motor vehicles, since these only have a very limited installation space due to the battery required for the electric drive. The blow molding process makes it possible for the tube arrangement to be adapted to the available installation space, the channels for the transport of tempering medium being dimensioned in such a way that optimal transport of temperature control medium is possible.

According to a second embodiment, the tube arrangement is part of a temperature control circuit of the drive unit of an electric vehicle. The tube arrangement supplies tempering medium to the elements of the drive unit to be temperature controlled, so that the elements can be temperature controlled within a desired temperature range. For example, the batteries can be heated or cooled depending on the requirements. Furthermore, components of the power electronics and also plug connections can be cooled by means of temperature control medium. The cooling of plug connections is particularly advantageous during fast charging processes since the plug connections can become very hot due to the high charging currents during fast charging. Because the tube arrangement is blow molded, the tube arrangement can be produced in a wide variety of shapes. This is particularly advantageous with regard to the installation space of the aforementioned components, which is limited and complexly shaped for a tube arrangement.

In a method according to the invention for producing a tube arrangement for the transport of tempering medium according to a first embodiment, a preform made of polymeric material is provided, the preform being arranged in a blow mold and the tube arrangement being shaped by means of a blow molding process, the blow mold being designed in such a way that at least one fluidic functional element is molded into the tube arrangement. The method according to the invention is particularly suitable for providing a tube arrangement for the air conditioning circuit of an air conditioning system, the fluidic functional element being designed as a throttle valve, which is molded directly into a channel of the tube arrangement.

In a method according to the invention for producing a tube arrangement for the transport of tempering medium according to a second embodiment, first a parison or preform made of polymeric material and at least one functional element to be arranged inside the tube arrangement are provided, the at least one functional element being arranged inside the parison, wherein the preform, with the at least one functional elements arranged therein, is arranged in a blow mold and the tube arrangement is shaped by means of a blow molding process. Accordingly, the functional element is arranged in the base body before it is given its final shape in the blow molding process. Due to the plastic deformation of the material of the base body, the functional elements can be firmly embedded in the interior of the base body. As a result, the elements are placed in the base body in a captive and stationary manner. The fact that the functional elements are integrated directly into the base body makes the assembly of the tube arrangement easier. Furthermore, due to the arrangement inside the tube arrangement, the functional elements are in direct operative connection with the tempering medium.

It is also conceivable that a first functional element is molded directly into the base body during the blow molding process, while a second functional element is arranged in the interior of the parison before molding and is given its place after the blow molding process has been completed. In this respect, the two methods mentioned above are combined. This makes it possible, for example, to form a throttle valve in a channel of the tube arrangement during the blow molding process and to place further functional elements, such as check valves, sensors, pumps, or connection blocks, in the base body.

BRIEF DESCRIPTION OF THE DRAWINGS

Some embodiments of the tube arrangement according to the invention are explained in more detail below with reference to the figures. These schematically show the following.

DETAILED DESCRIPTION

Figure 1:
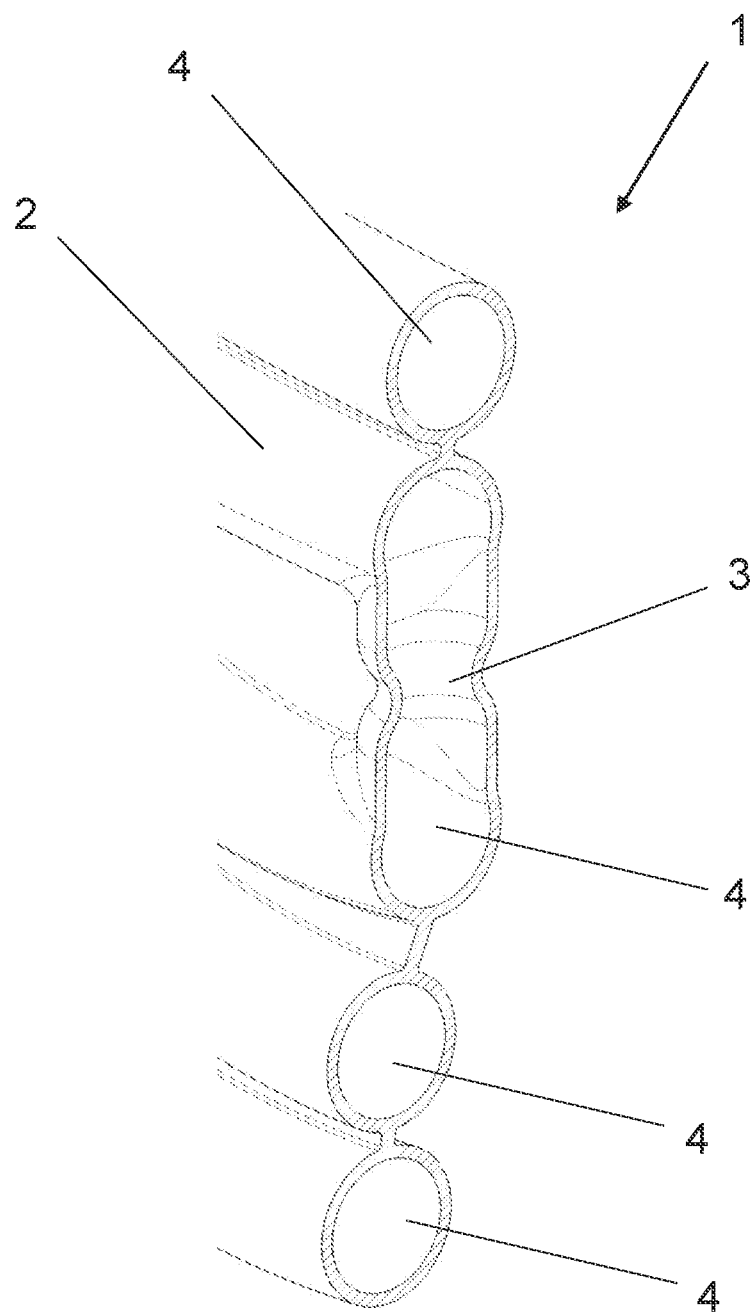
FIG. 1 shows a tube arrangement with a throttle valve molded into the base body.

FIG. 1 shows a tube arrangement 1 for the transport of temperature control medium or tempering medium, comprising a base body 2 made of polymeric material and produced by means of blow molding. In the base body 2, at least one functional element 3 is arranged, which is in operative connection with the tempering medium. The functional element 3 is arranged in a channel 4, the functional element 3 being formed in one piece from the base body 2. The functional element 3 forms a throttle valve and is formed by a cross-sectional narrowing of the channel 4.

Figure 2:
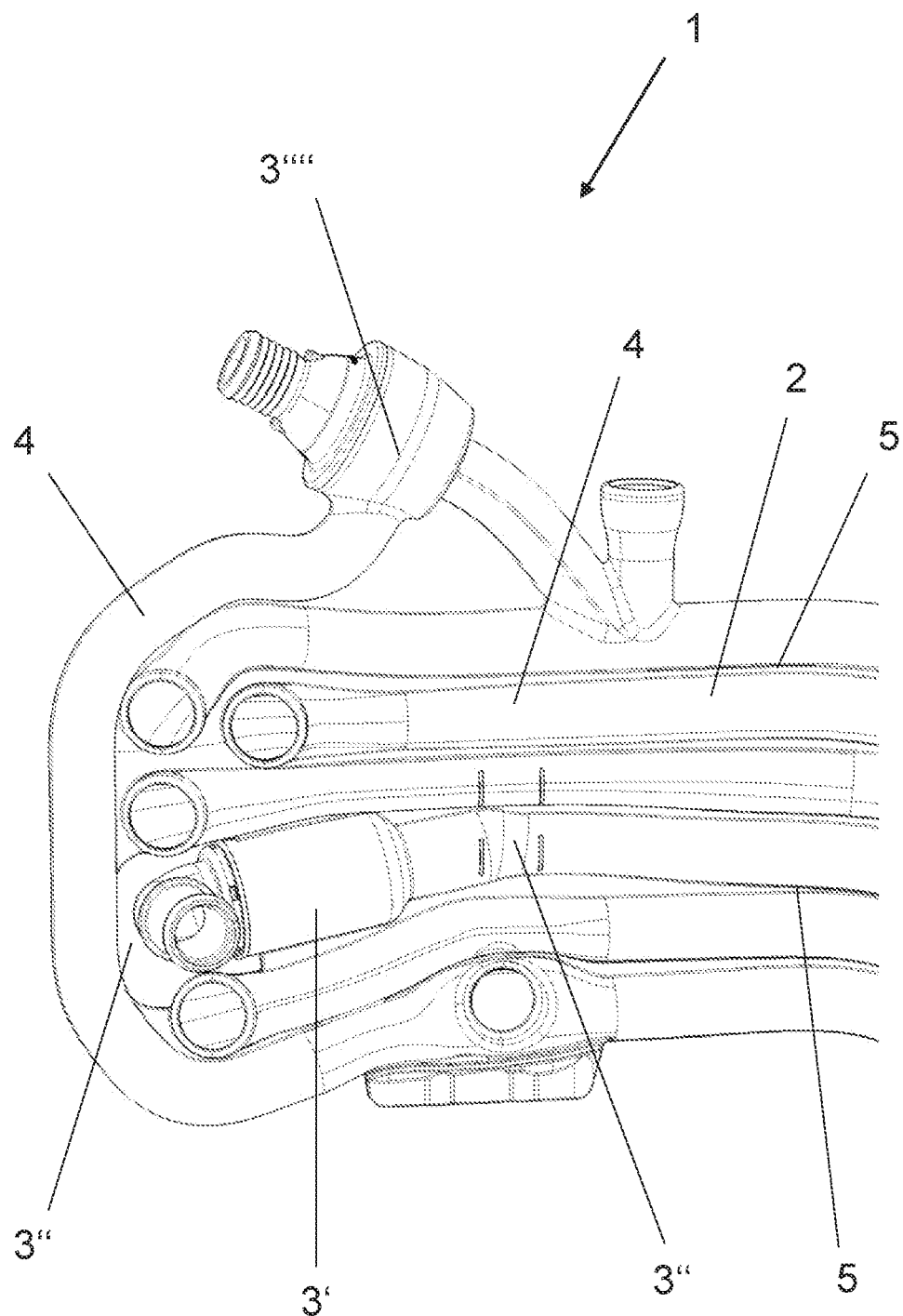
FIG. 2 shows a tube arrangement with several separately formed functional elements.

FIG. 2 shows a tube arrangement 1 according to FIG. 1, the base body 2 comprising a plurality of functional elements 3 which are formed separately from the base body 2 and are arranged in the interior of the base body 2. The base body 2 has a plurality of channels 4, a channel wall 5 being located between each of the channels 4.

The tube arrangement 1 comprises several functional elements 3, including a check valve 3', a temperature sensor, a pressure sensor, a flow sensor and a connector in the form of a connection block 3" for connecting the tube arrangement 1 to adjacent units or tubes/lines/pipelines. Furthermore, the tube arrangement 1 has a throttle valve 3''' which is molded directly into a channel 4 and which is molded from the base body 2 as a single material and in one piece.

Figure 3:
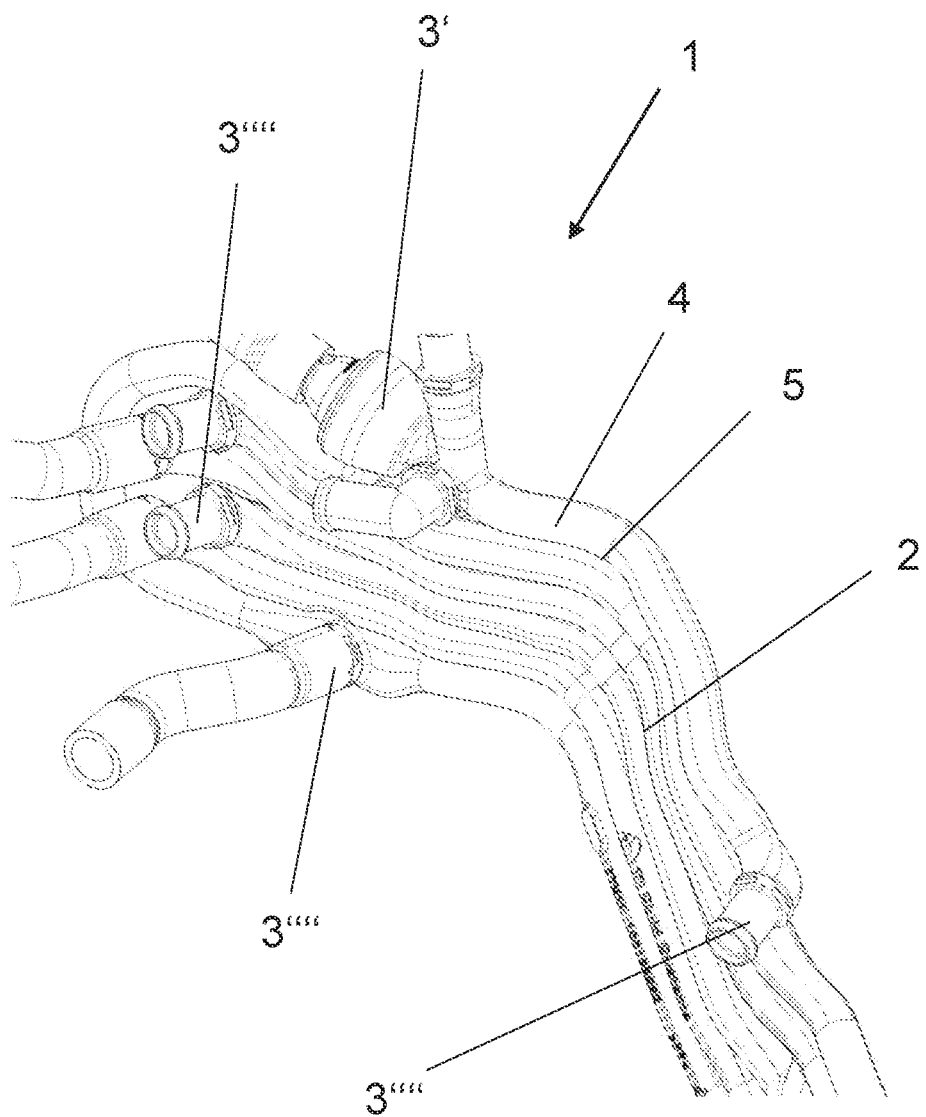
FIG. 3 shows a further tube arrangement with several separately formed functional elements.

FIG. 3 shows an alternative embodiment of the tube arrangement 1 shown in FIG. 2. Several functional elements 3 in the form of a check valve 3' and several connectors 3'''' are introduced into the tube arrangement 1.

The tube arrangements 1 shown in FIGS. 1 to 3 form part of an air conditioning circuit of an air conditioning system, the air conditioning system being designed as a mobile air conditioning system of a motor vehicle. According to a further embodiment, the tube arrangements 1 form part of a temperature control circuit of the drive unit of an electric vehicle, the tube arrangements 1 supplying tempering medium to the cells of the batteries and the electrical control components and plug connections.

In a further embodiment, the tube arrangement 1 is part of a temperature control device, which is set up to control the temperature of components of the drive unit of electric vehicles. In addition to the battery, this includes the power electronics and the electric motors. Furthermore, the temperature control device is set up to cool the charging electronics and the associated plug connections and lines, which is particularly advantageous in connection with fast charging processes.

Furthermore, the temperature control device can be set up to control the temperature of components of the remaining vehicle electronics, in particular to cool them. Such components are, for example, sensors and computers for autonomous driving and on-board computers.

In the method for producing a tube arrangement 1 according to FIG. 1, a preform made of polymeric material is provided, the preform being arranged in a blow mold and the tube arrangement 1 being shaped by means of a blow molding process. The blow mold is designed in such a way that the functional element 3 is molded into the tube arrangement 1.

In the method for producing a tube arrangement 1 according to FIG. 2, a parison made of polymeric material of at least one functional element 3 to be arranged inside the tube arrangement 1 is first provided, the at least one functional element 3 being arranged in the interior of the preform, wherein the parison with the at least one functional element 3 arranged therein is arranged in a blow mold and the tube arrangement 1 is formed by means of a blow molding process. The throttle valve 3''' is formed from the base body 2 during the blow molding. Accordingly, the blow mold is designed in such a way that the functional element 3 in the form of the throttle valve 3''' is molded into the tube arrangement 1 with this method as well.

The invention claimed is:

1. A tube arrangement for the transport of tempering medium, comprising a base body made of polymeric material and produced by means of blow molding, wherein the base body has a plurality of channels, wherein a channel wall is located between the channels, the plurality of channels having a length and the channel wall extending along the length of the plurality of channels, and wherein at least one functional element which is in operative connection with the tempering medium is arranged in a channel of the plurality of channels of the base body.

2. The tube arrangement according to claim 1, wherein at least one functional element is formed from the base body.

3. The tube arrangement according to claim 2, wherein the functional element formed from the base body forms a throttle valve, connecting element or connector.

4. The tube arrangement according to claim 1, wherein at least one functional element is formed separately from the base body.

5. The tube arrangement according to claim 4, wherein the functional element formed separately from the base body is formed as a valve, throttle valve, check valve, sensor, pump, connecting element or connector.

6. A temperature control circuit comprising the tube arrangement according to claim 1.

7. A temperature control circuit comprising the tube arrangement according to claim 1, wherein the temperature control circuit is arranged in a mobile device.

8. A method for producing a tube arrangement for the transport of tempering medium, in which a parison made of polymeric material is provided, wherein the parison is arranged in a blow mold and the tube arrangement is shaped by means of a blow molding process to form a base body defining a plurality of channels, and a channel wall located between the channels and extending along a length of the plurality of channels, the blow mold being designed in such a way that at least one functional element is molded into a channel of the plurality of channels of the tube arrangement.

9. A method for producing a tube arrangement for the transport of tempering medium, in which first a parison made of polymeric material and at least one functional element to be arranged inside the tube arrangement are provided, wherein the at least one functional element is arranged in the inside of the parison, wherein the parison with the at least one functional element arranged therein is arranged in a blow mold and the tube arrangement is shaped by means of a blow molding process, wherein the tube assembly is blow molded to have a base body defining a plurality of channels having a length, and a channel wall located between the channels and extending along the length of the channels.

10. The method according to claim 9, wherein the blow mold is designed in such a way that at least one functional element is molded into the tube arrangement when the tube arrangement is formed by means of blow molding.

* * * * *